(12) United States Patent
Tone et al.

(10) Patent No.: US 12,086,824 B2
(45) Date of Patent: Sep. 10, 2024

(54) INFORMATION PROCESSING DEVICE

(71) Applicant: TOYOTA JIDOSHA KABUSHIKI KAISHA, Toyota (JP)

(72) Inventors: Yuta Tone, Nagoya (JP); Yukinori Il, Toyota (JP); Tadayuki Tanaka, Nagoya (JP); Naoki Ishizuka, Nagoya (JP); Yuichiro Yano, Nagakute (JP); Nariaki Amano, Nagoya (JP); Yusuke Maeda, Miyoshi (JP); Kei Yazaki, Okazaki (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 17/723,776

(22) Filed: Apr. 19, 2022

(65) Prior Publication Data
US 2022/0383352 A1  Dec. 1, 2022

(30) Foreign Application Priority Data
May 26, 2021  (JP) .................. 2021-088722

(51) Int. Cl.
G06Q 30/0201 (2023.01)
G06Q 30/02 (2023.01)
G06Q 30/0202 (2023.01)

(52) U.S. Cl.
CPC ..... G06Q 30/0206 (2013.01); G06Q 30/0202 (2013.01); G06Q 30/0278 (2013.01)

(58) Field of Classification Search
CPC ............ G06Q 30/0206; G06Q 30/0278
See application file for complete search history.

(56) References Cited

U.S. PATENT DOCUMENTS

| | | | | |
|---|---|---|---|---|
| 2002/0077377 A1* | 6/2002 | Zhang | ............... | C09D 5/20 521/82 |
| 2006/0080210 A1* | 4/2006 | Mourad | ............... | G06Q 40/04 705/37 |
| 2006/0190110 A1* | 8/2006 | Holt | ............... | G06Q 10/06 700/283 |
| 2009/0157349 A1* | 6/2009 | Walker | ............... | G01B 7/066 702/170 |

(Continued)

FOREIGN PATENT DOCUMENTS

| | | |
|---|---|---|
| JP | 2003-316881 A | 11/2003 |
| JP | 2009-76035 A | 4/2009 |

(Continued)

OTHER PUBLICATIONS

Christopher W. Leitz, Life Cycle Cost Modeling of Automotive Paint Systems, Thesis (M. B.A.)—Massachusetts Institute of Technology, Sloan School of Management; and, (S.M.)—Dept. of Electrical Engineering and Computer Science; in conjunction with the Leaders for Manufacturing Program at MIT, 2007. (Year: 2007).*

*Primary Examiner* — Andre D Boyce
(74) *Attorney, Agent, or Firm* — Sughrue Mion, PLLC

(57) ABSTRACT

A first paint color is acquired as a color of a paint of a first vehicle. A second paint color is acquired as a color of a paint including a peelable layer and to be applied over at least a part of the paint in the first paint color. A current or future valuation price of the first vehicle is acquired based on the first paint color or the second paint color.

17 Claims, 12 Drawing Sheets

(56) References Cited

U.S. PATENT DOCUMENTS

| | | | |
|---|---|---|---|
| 2010/0211511 A1 | 8/2010 | Kawasaki | |
| 2013/0103449 A1* | 4/2013 | McGinn | G06Q 10/06 705/7.15 |
| 2013/0173330 A1* | 7/2013 | Puskorius | G06Q 10/00 705/7.25 |
| 2014/0279169 A1* | 9/2014 | Leos | G06Q 10/20 705/26.4 |
| 2021/0233164 A1* | 7/2021 | Gaur | G06Q 30/0641 |

FOREIGN PATENT DOCUMENTS

| | | | | |
|---|---|---|---|---|
| WO | WO-2005059841 A1 * | 6/2005 | | G01J 3/463 |
| WO | WO-2006052812 A1 * | 5/2006 | | G06Q 10/06 |

* cited by examiner

FIG. 3

CONTRACT DATA

| USER ID | VEHICLE MODEL ID | FIRST BODY COLOR | SECOND BODY COLOR | CONTRACT TERM | START DATE OF CONTRACT | END DATE OF CONTRACT | MONTHLY USAGE FEE |
|---|---|---|---|---|---|---|---|
| U001 | T001 | P001 | P011 | 3 YEARS | 2021/1/1 | 2023/12/31 | 40000 YEN |
| U002 | T002 | P001 | P012 | 5 YEARS | 2021/1/1 | 2025/12/31 | 55000 YEN |
| U003 | T003 | P002 | P013 | 7 YEARS | 2021/1/1 | 2027/12/31 | 45000 YEN |
| ... | ... | ... | ... | ... | ... | ... | ... |

FIG. 4

RESIDUAL VALUE DATA

| VEHICLE MODEL ID | FIRST BODY COLOR | APPLICATION PERIOD | CONTRACT TERM | SET RESIDUAL VALUE |
|---|---|---|---|---|
| V001 | P001 | 2021/4/1- 2021/4/30 | 3 YEARS | 1,500,000 YEN |
| V001 | P001 | ... | 5 YEARS | ... |
| V001 | P001 | ... | 7 YEARS | ... |
| V001 | P002 | ... | 3 YEARS | ... |
| V001 | P002 | ... | ... | ... |
| V001 | P003 | ... | 3 YEARS | ... |
| V001 | P003 | ... | ... | ... |
| V001 | P004 | ... | ... | ... |
| ... | ... | ... | ... | ... |

FIG. 5

VEHICLE DATA

| VEHICLE MODEL ID | FIRST BODY COLOR | STATUS | DELIVERY DATE A | DELIVERY DATE B | VEHICLE BASE |
|---|---|---|---|---|---|
| T001 | P001 | STOCK AVAILABLE | PROMPT | 2 WEEKS | CARPOOL A |
| T002 | P002 | PRODUCED BY ORDER | 8 WEEKS | 10 WEEKS | FACTORY B |
| ... | ... | ... | ... | ... | ... |

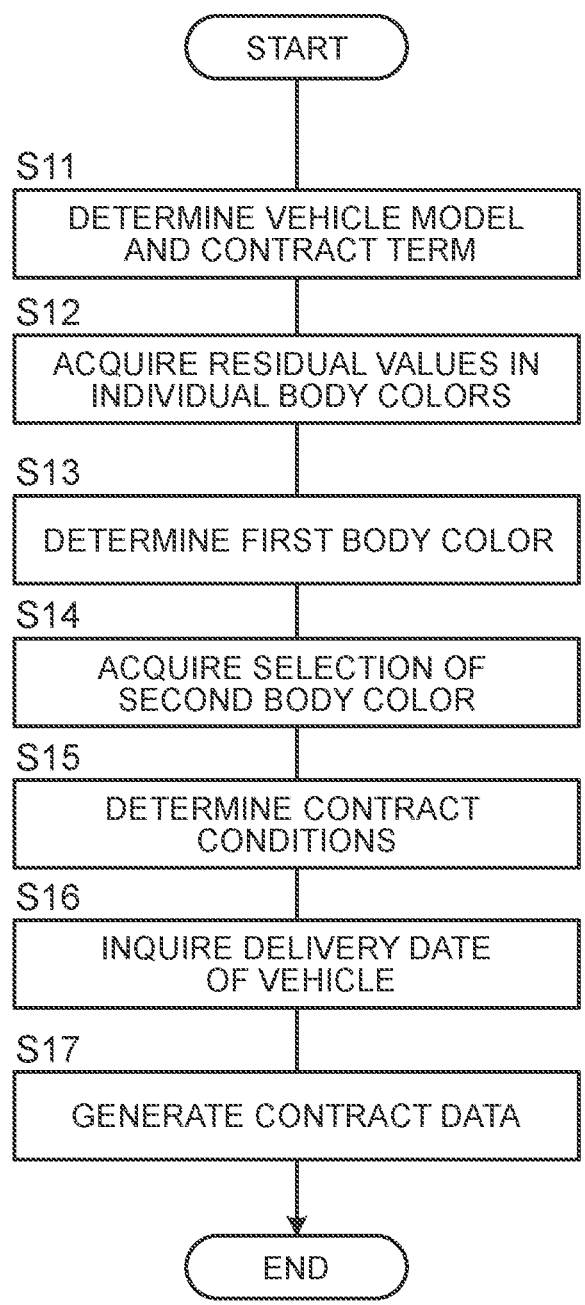

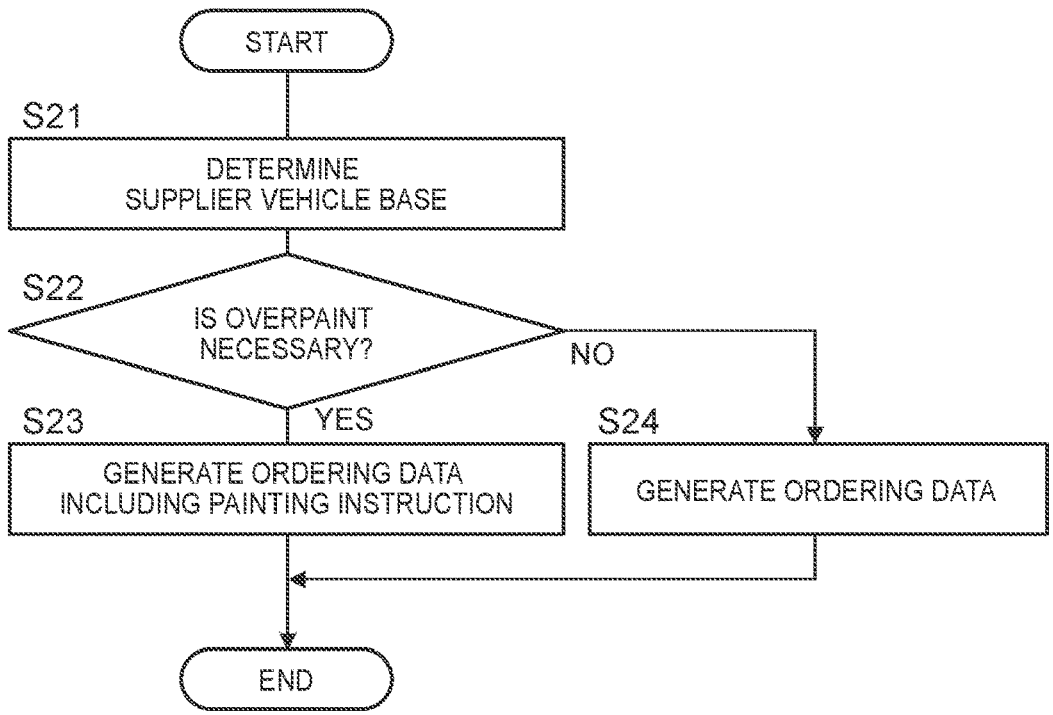

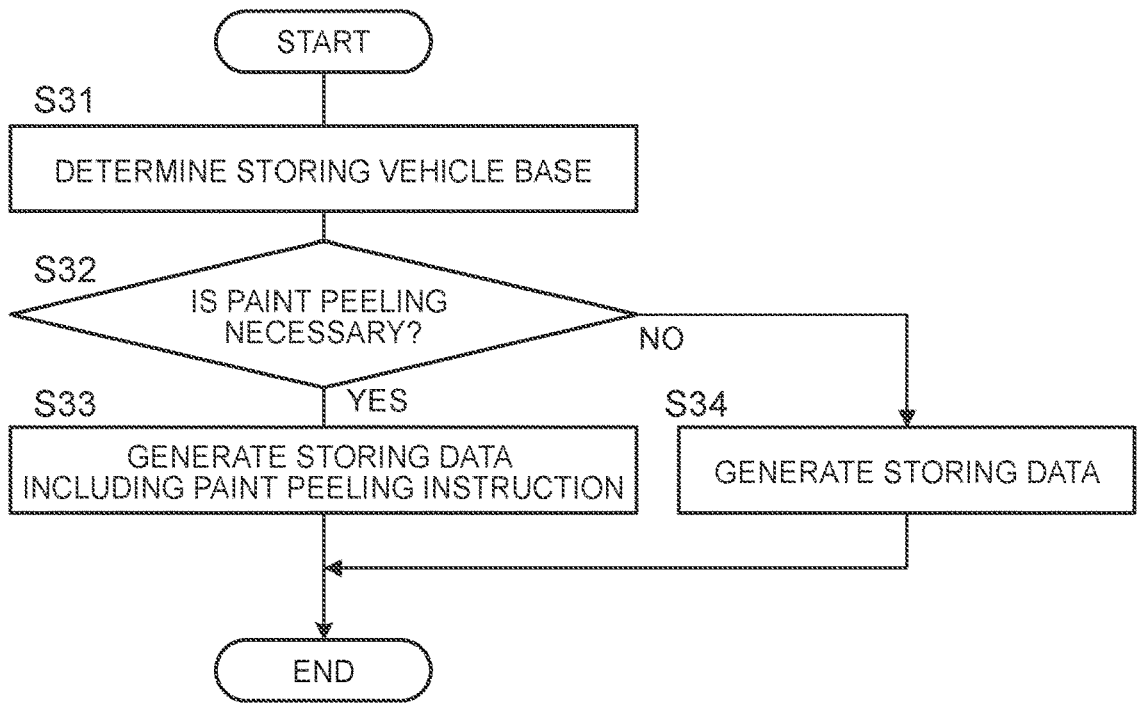

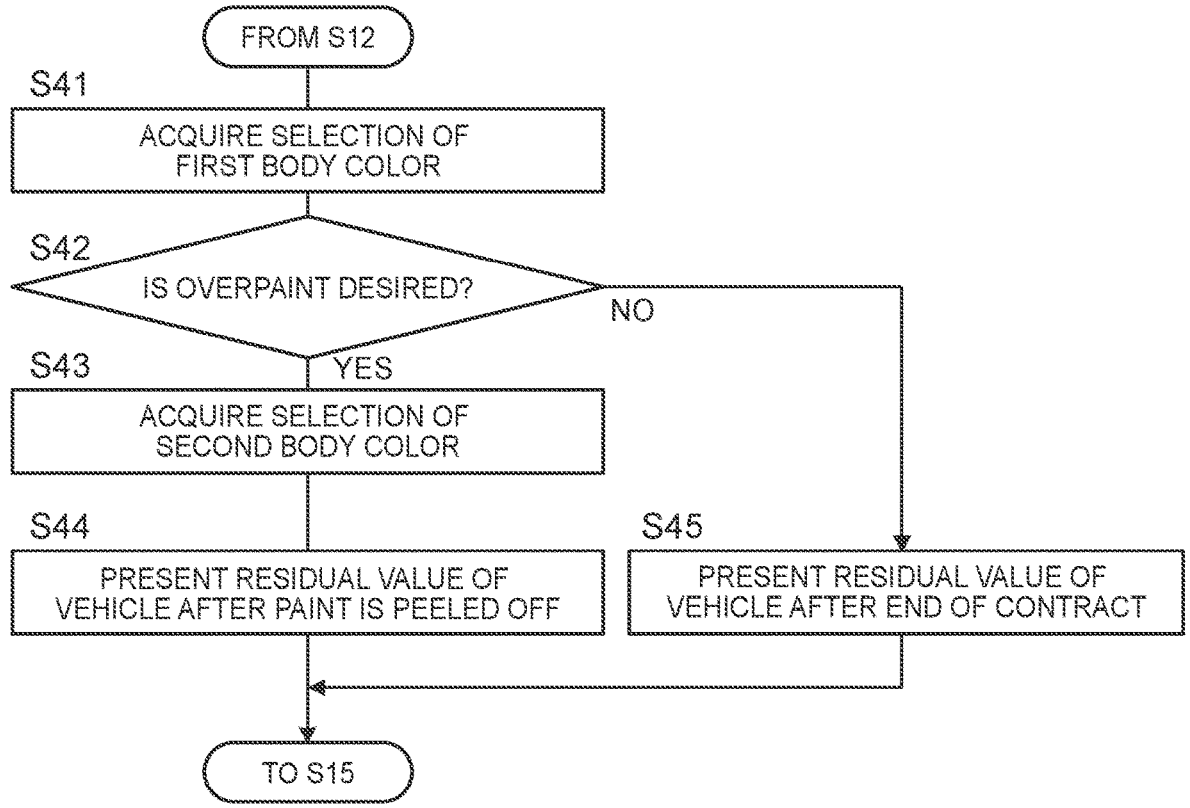

FIG. 15

RESIDUAL VALUE DATA

| VEHICLE MODEL ID | FIRST BODY COLOR | SECOND BODY COLOR | APPLICATION PERIOD | CONTRACT TERM | SET RESIDUAL VALUE |
|---|---|---|---|---|---|
| V001 | P001 | P001 | 2021/4/1 - 2021/4/30 | 3 YEARS | 1,500,000 YEN |
| V001 | P001 | P002 | ... | 3 YEARS | ... |
| V001 | P001 | P003 | ... | 3 YEARS | ... |
| V001 | P002 | ... | ... | ... | ... |
| V001 | P002 | ... | ... | ... | ... |
| V001 | P003 | ... | ... | ... | ... |
| V001 | P003 | ... | ... | ... | ... |
| V001 | P004 | ... | ... | ... | ... |
| ... | ... | ... | ... | ... | ... |

FIG. 16

RESIDUAL VALUES OF VEHICLE WITHOUT REMOVAL OF
OVERPAINT AFTER END OF CONTRACT

VEHICLE MODEL: XXXX (CONTRACT TERM: 3 YEARS)

| ORIGINAL COLOR | OVERPAINT COLOR | SET RESIDUAL VALUE |
|---|---|---|
| WHITE PEARL | WHITE PEARL | 1,680,000 YEN |
| WHITE PEARL | SILVER METALLIC | 1,590,000 YEN |
| WHITE PEARL | SENSUAL RED | 1,520,000 YEN |
| WHITE PEARL | DARK BLUE | 1,550,000 YEN |
| WHITE PEARL | GRAY METALLIC | 1,600,000 YEN |
| WHITE PEARL | BLACK MICA | 1,610,000 YEN |

NEXT

INFORMATION PROCESSING DEVICE

CROSS-REFERENCE TO RELATED APPLICATION

This application claims priority to Japanese Patent Application No. 2021-088722 filed on May 26, 2021, incorporated herein by reference in its entirety.

BACKGROUND

1. Technical Field

The present disclosure relates to an information processing device.

2. Description of Related Art

It is known that a valuation price when selling a used car varies depending on body colors. As a related disclosure, for example, Japanese Unexamined Patent Application Publication No. 2003-316881 (JP 2003-316881 A) discloses a system for calculating a valuation price of a vehicle based on specifications of the vehicle including a body color.

SUMMARY

The present disclosure provides an information processing device capable of accurately determining a resale value of a vehicle.

A first aspect of the present disclosure relates to an information processing device including a controller configured to acquire a first paint color that is a color of a paint of a first vehicle, acquire a second paint color that is a color of a paint including a peelable layer and to be applied over at least a part of the paint in the first paint color, and acquire a current or future valuation price of the first vehicle based on the first paint color or the second paint color.

A second aspect of the present disclosure relates to an information processing device including a controller configured to acquire a first paint color that is a color of a paint of a first vehicle, acquire a second paint color that is a color of a paint including a peelable layer and to be applied over at least a part of the paint in the first paint color, and determine, based on the first paint color or the second paint color, an amount to be paid as a value of the first vehicle by a user who uses the first vehicle for at least a predetermined period.

A third aspect of the present disclosure relates to an information processing device including a controller configured to acquire information about whether a first vehicle including a first paint is overpainted with a second paint including a peelable layer, and acquire an expected valuation price of the first vehicle after an elapse of a predetermined period based on whether the second paint is painted.

Other aspects of the present disclosure relate to a method to be executed by the information processing device, a program for causing a computer to execute the method, or a non-transitory computer-readable storage medium storing the program.

According to the present disclosure, the resale value of the vehicle can be determined accurately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 illustrates an example of contract data generated by the contract management server;

FIG. 4 illustrates an example of residual value data stored in the contract management server;

FIG. 5 illustrates an example of vehicle data stored in the dealer server;

FIG. 7 is a flowchart of a process to be executed by the contract management server;

FIG. 8 illustrates an example of a screen for acquiring information about a contract;

FIG. 9 is a flowchart of a process to be executed by the dealer server at the time of making the contract;

FIG. 10 is a flowchart of a process to be executed by the dealer server at the end of the contract;

FIG. 11 illustrates an example of a screen presented to a user in a second embodiment;

FIG. 12 illustrates an example of a screen presented to the user in the second embodiment;

FIG. 13 is a flowchart of a process to be executed by a contract management server in a third embodiment;

FIG. 15 illustrates an example of residual value data in a fourth embodiment; and FIG. 16 illustrates an example of a screen presented to the user in the fourth embodiment.

DETAILED DESCRIPTION OF EMBODIMENTS

Figure 1:
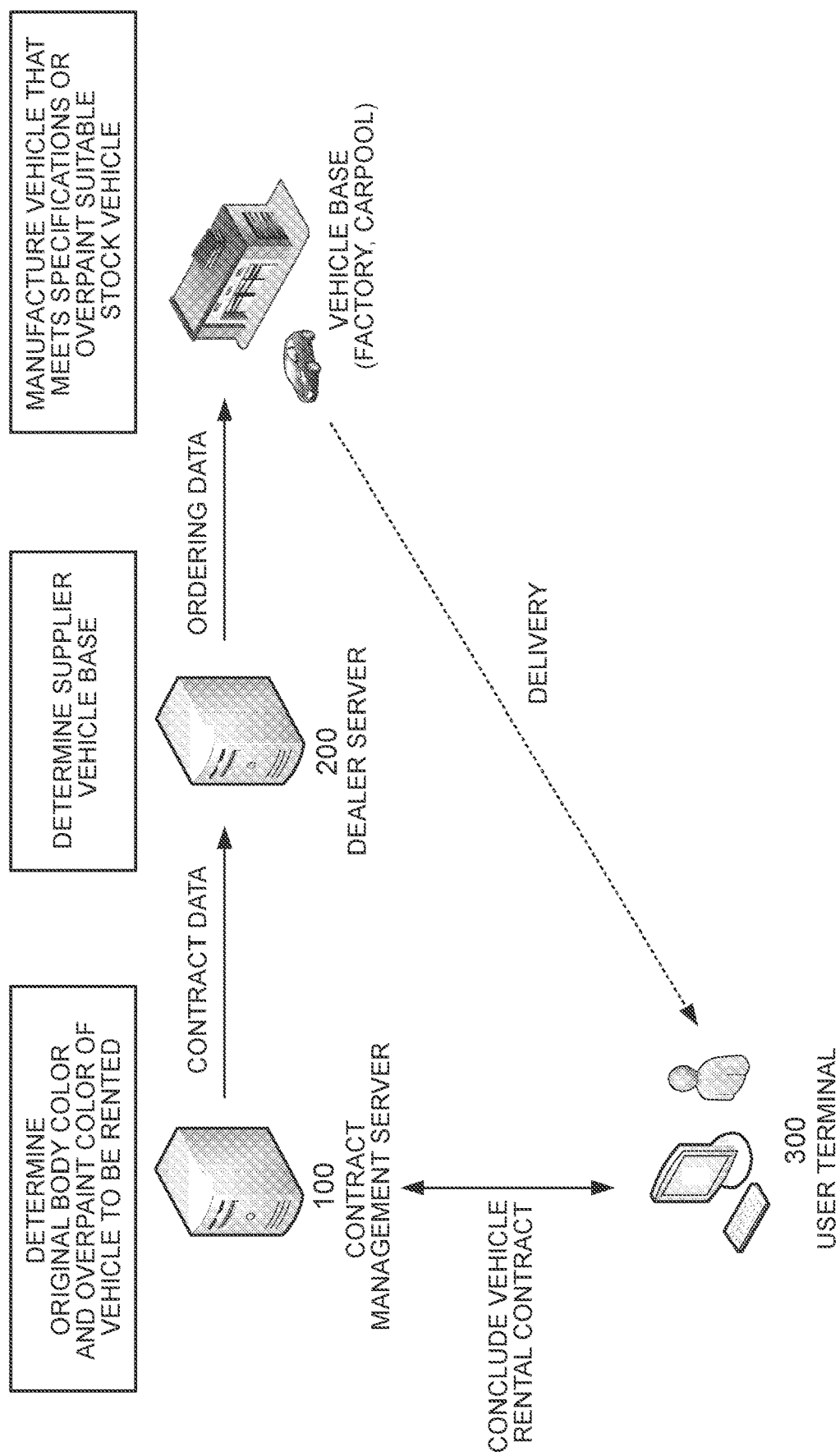
FIG. 1 is a diagram illustrating an outline of a vehicle rental system.

It is known that a valuation price when selling an automobile as a used car varies depending on the body color of the automobile. For example, a vehicle in a color that is popular in the used car market may have a higher valuation price than that of a vehicle in an unpopular color.

There is known a type of contract (also called "lease" or "subscription") in which a vehicle is rented to a user by receiving a regular fee payment during a contract term. In this type of contract, the user can rent a vehicle in a desired color.

However, the body color desired by the user is not always a color that is highly evaluated in the used car market. That is, the sale price after the vehicle is returned varies depending on the body color desired by the user.

An information processing device according to a first aspect of the present disclosure includes a controller configured to acquire a first paint color that is a color of a paint of a first vehicle, acquire a second paint color that is a color of a paint including a peelable layer and to be applied over at least a part of the paint in the first paint color, and acquire a current or future valuation price of the first vehicle based on the first paint color or the second paint color.

The peelable layer refers to a layer of a paint film that can be applied to a vehicle body and can be peeled off after an event. The paint including the peelable layer may be, for example, a combination of a peelable paint film and a general paint, or a paint layer that can be peeled off (peelable paint).

By overpainting the vehicle with the paint including the peelable layer, the overpaint can be peeled off after the event (that is, the body color can be returned to the original body color).

When ordering such a vehicle whose body color can be changed, it is preferable to determine the combination of the first paint color and the second paint color in consideration of a future resale value.

Therefore, the information processing device according to the present disclosure acquires the current or future valuation price of the first vehicle based on the first paint color or the second paint color.

The valuation price may be a valuation price after an elapse of a predetermined period (for example, after the end of a vehicle lease contract).

According to such a case, it is possible to provide a vehicle having a body color that meets the user's desire while maintaining the resale value of the vehicle.

In the information processing device, the controller may be configured to acquire an expected valuation price of the first vehicle after the elapse of the predetermined period based on the first paint color or the second paint color. In the information processing device, the controller may be configured to acquire the expected valuation price of the first vehicle after the elapse of the predetermined period based on the first paint color and the second paint color.

In the information processing device, the controller may be configured to acquire, based on the first paint color, an expected valuation price of the first vehicle in a case where the peelable layer is peeled off after the elapse of the predetermined period. When the peelable layer is peeled off, the color of the vehicle is restored to the first paint color. Therefore, the expected valuation price can be obtained based on the first paint color.

In the information processing device, the controller may be configured to acquire both a first expected valuation price of the first vehicle in a case where the peelable layer is peeled off after the elapse of the predetermined period, and a second expected valuation price of the first vehicle in a case where the peelable layer is not peeled off. Depending on the peelable layer and the useful life of the overpaint, the value of the vehicle with the overpaint may be higher than that of a vehicle without the overpaint. Therefore, the two types of expected valuation price may be obtained in consideration of such a case.

In the information processing device, the controller may be configured to determine, based on the expected valuation price, an amount to be paid as a value of the first vehicle by a user who uses the first vehicle for at least the predetermined period.

For example, when the first vehicle is a leased vehicle or a vehicle that is sold on an installment basis, a monthly payment amount may be determined based on the expected valuation price (that is, residual value) after the elapse of the predetermined period.

In the information processing device, for example, the payment amount of the user may be determined based on an amount obtained by subtracting the expected valuation price from a price of the first vehicle.

The controller may directly determine the payment amount of the user based on the first paint color or the second paint color without calculating the expected valuation price.

The information processing device may be configured to determine specifications of the first vehicle to be used by the user. The controller may be configured to acquire, for individual first paint colors, expected valuation prices of the first vehicle in a case where the peelable layer is peeled off after the elapse of the predetermined period. When it is premised that the peelable layer will be peeled off after the elapse of the predetermined period as in the case where the first vehicle is a leased vehicle, an optimal first paint color can be determined by acquiring the expected valuation prices for the individual first paint colors.

In the information processing device, the controller may be configured to present the expected valuation prices to the user for the individual first paint colors and receive designation of any one of the first paint colors from the user.

In the information processing device, the controller may be configured to determine, as the first paint color, a paint color in which the expected valuation price is higher than a predetermined price.

According to such a configuration, it is possible to determine a first paint color with a higher residual value.

In the information processing device, the first vehicle may be a vehicle to be rented to the user during the predetermined period, and the controller may be configured to determine a rental condition of the first vehicle based on the expected valuation price. When renting a vehicle by lease or subscription, the usage fee of the vehicle is often determined based on the residual value of the vehicle after the end of a contract. Therefore, the contract conditions such as the usage fee may be determined based on the expected valuation price.

In the information processing device, the first paint color may be selected from a first category, and the second paint color may be selected from a second category including more color variations than color variations of the first category. In the information processing device, the first paint color may be a body color including a pearl layer. This is because body colors such as white, pearl, and black generally tend to have higher residual values than those in the other body colors.

An information processing device according to another aspect of the present disclosure includes a controller configured to acquire a first paint color that is a color of a paint of a first vehicle, acquire a second paint color that is a color of a paint including a peelable layer and to be applied over at least a part of the paint in the first paint color, and determine, based on the first paint color or the second paint color, an amount to be paid as a value of the first vehicle by a user who uses the first vehicle for at least a predetermined period.

In the information processing device, the controller may be configured to acquire an expected valuation price of the first vehicle after an elapse of the predetermined period based on the first paint color or the second paint color, and determine the amount based on the expected valuation price.

In the information processing device, the controller may be configured to acquire, based on the first paint color, an expected valuation price of the first vehicle in a case where the peelable layer is peeled off after the elapse of the predetermined period, and determine the amount based on the expected valuation price.

In the information processing device, the amount may be determined based on an amount obtained by subtracting the expected valuation price from a price of the first vehicle.

An information processing device according to another aspect of the present disclosure includes a controller configured to acquire information about whether a first vehicle including a first paint is overpainted with a second paint including a peelable layer, and acquire an expected valuation price of the first vehicle after an elapse of a predetermined period based on whether the second paint is present.

In the information processing device, the controller may be configured to, when the first vehicle includes the second paint, acquire an expected valuation price of the first vehicle in a case where the second paint is peeled off after the elapse of the predetermined period.

In the information processing device, the controller may be configured to, when the first vehicle is painted with the second paint, calculate a higher price as the expected valuation price of the first vehicle as compared with a case where the first vehicle is not painted with the second paint.

When the overpaint using the peelable layer is applied, the first paint is protected. Therefore, even with the same body color, the valuation price may be higher than that of a vehicle without the overpaint. Therefore, the expected valuation price of the first vehicle may be obtained based on whether the second paint is present.

When the first vehicle is painted with the second paint, a higher price may be calculated as the expected valuation price of the first vehicle as compared with the case where the first vehicle is not painted with the second paint.

Hereinafter, specific embodiments of the present disclosure will be described with reference to the drawings. The hardware configuration, module configuration, functional configuration, etc. described in each embodiment are not intended to limit the technical scope of the disclosure to these configurations unless otherwise specified.

First Embodiment

An outline of a vehicle rental system according to a first embodiment will be described with reference to FIG. 1. The vehicle rental system according to the present embodiment includes a contract management server 100 (information processing device), a dealer server 200, and a user terminal 300.

In the following description, a vehicle rental contract is referred to as "lease contract".

The contract management server 100 is a server device that manages vehicle lease contracts made by users with a leasing company. In the present embodiment, the vehicle lease contract is a contract in which the user pays a monthly usage fee to register the user in a public institution as a user of a vehicle owned by a predetermined leasing company. The term of the contract is predetermined and can be, for example, about one month to several years. The contract management server 100 concludes the lease contract by interacting with the user terminal 300.

The dealer server 200 is a server device owned by a dealer (car dealer) that provides a plurality of vehicles to be rented to users. The dealer server 200 acquires data related to the vehicle rental contract from the contract management server 100, and places an order for a vehicle when a new rental contract is concluded. The order for the vehicle is placed with a plurality of vehicle bases. The vehicle base is, for example, a carpool to which stock vehicles belong or a vehicle manufacturing factory.

When the original body color of the vehicle to be rented to the user is different from a body color desired by the user, the dealer server 200 instructs the vehicle base to paint the vehicle with a peelable paint.

The user terminal 300 is a computer owned by a user who uses a vehicle rental service. The user can access the contract management server 100 via the user terminal 300 and apply for a vehicle rental contract. The user may transmit desired conditions (for example, contract term, desired vehicle model, body color, and other attributes) to the contract management server 100.

Figure 2:
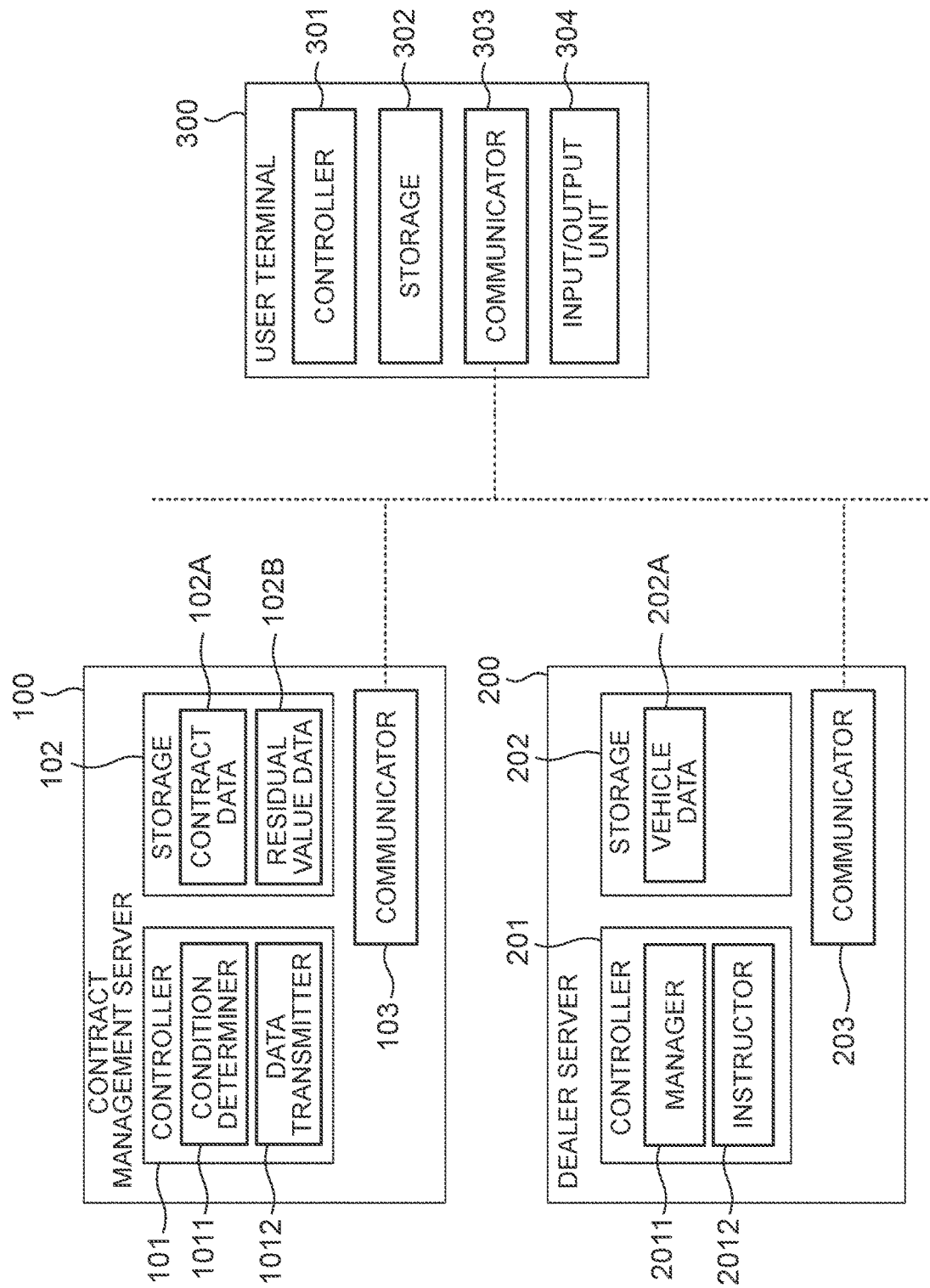
FIG. 2 is a diagram illustrating configurations of a contract management server, a dealer server, and a user terminal.

FIG. 2 is a diagram illustrating in more detail the components of the contract management server 100, the dealer server 200, and the user terminal 300 included in the vehicle rental system according to the present embodiment. First, the user terminal 300 will be described.

The user terminal 300 is a computer to be used by an individual, such as a personal computer, a smartphone, a mobile phone, a tablet computer, or a personal information terminal. The user terminal 300 includes a controller 301, a storage 302, a communicator 303, and an input/output unit 304.

The controller 301 is an arithmetic unit responsible for control that is performed by the user terminal 300. The controller 301 can be implemented by an arithmetic processing unit such as a central processing unit (CPU).

The controller 301 executes a function of accessing and interacting with the contract management server 100. The function may be implemented by a web browser operating on the user terminal 300 or by dedicated application software.

The storage 302 includes a main storage device and an auxiliary storage device. The main storage device is a memory where a program to be executed by the controller 301 and data to be used by the control program are loaded. The auxiliary storage device stores programs to be executed by the controller 301 and data to be used by the control programs. The auxiliary storage device may store a package of applications of the programs to be executed by the controller 301. The auxiliary storage device may store an operating system for running these applications. Processes that will be described later are performed such that the programs stored in the auxiliary storage device are loaded into the main storage device and executed by the controller 301.

The main storage device may include a random access memory (RAM) or a read only memory (ROM). The auxiliary storage device may include an erasable programmable ROM (EPROM) or a hard disk drive (HDD). The auxiliary storage device may include a removable medium, that is, a portable recording medium.

The communicator 303 is a wireless communication interface for connecting the user terminal 300 to a network. The communicator 303 is communicable with the contract management server 100 via, for example, a wireless local area network (LAN) or a mobile communication service such as third generation (3G), Long-Term Evolution (LTE), or fifth generation (5G).

The input/output unit 304 receives an input operation performed by the user and presents information to the user. In the present embodiment, the input/output unit 304 is a single touch panel display. That is, the input/output unit 304 includes a liquid crystal display and its controller, and a touch panel and its controller.

Next, the contract management server 100 will be described. The contract management server 100 is a server device that concludes a vehicle lease contract based on a request transmitted from the user terminal 300.

In the present embodiment, the contract management server 100 may execute a web server for interacting with the user terminal 300. In this case, for example, the user terminal 300 can access a web service by using a browser to perform a procedure for concluding the lease contract. The contract management server 100 may provide the service by means other than the web server. For example, the contract management server 100 may execute a service for interacting with dedicated application software installed in the user terminal 300 by a predetermined protocol.

The contract management server 100 may be a general-purpose computer. That is, the contract management server 100 may be a computer including a processor such as a CPU or a graphics processing unit (GPU), a main storage device such as a RAM or a ROM, and an auxiliary storage device such as an EPROM, a hard disk drive, or a removable medium. An operating system (OS), various programs, various tables, and the like are stored in the auxiliary storage device. The programs stored in the auxiliary storage device are executed by being loaded into a work area of the main storage device. Through the execution of the programs, the individual components are controlled to implement various functions for predetermined purposes as described later. Part or all of the functions may be implemented by a hardware circuit such as an application-specific integrated circuit (ASIC) or a field-programmable gate array (FPGA).

The contract management server 100 includes a controller 101, a storage 102, and a communicator 103. The controller 101 is an arithmetic unit responsible for control that is performed by the contract management server 100. The controller 101 can be implemented by an arithmetic processing unit such as a CPU.

The controller 101 includes two functional modules that are a condition determiner 1011 and a data transmitter 1012. Each functional module may be implemented by the CPU executing the stored programs.

The condition determiner 1011 determines conditions of the lease contract by interacting with the user terminal 300. The condition determiner 1011 determines at least the following items as the contents of the lease contract.

(1) Model of leased vehicle
(2) Term of lease contract
(3) First body color of leased vehicle
(4) Second body color of leased vehicle The first body color is the original body color of the leased vehicle (first paint color). The second body color is a paint color to be applied by using the peelable paint (second paint color).

In the present embodiment, a vehicle in a predetermined body color (first body color) is overpainted in a designated color (second body color) by using the peelable paint. As a result, the user of the leased vehicle can use the vehicle in the desired body color during the lease period. After the vehicle is returned, the body color can be returned to a body color with a high resale value by peeling off the peelable paint. In the first embodiment, the device determines the first body color in accordance with a predetermined rule, and the user who will rent the vehicle designates the second body color.

The data transmitter 1012 generates contract data based on the contents of the lease contract determined by the condition determiner 1011 and transmits the contract data to the dealer server 200.

The storage 102 includes a main storage device and an auxiliary storage device. The main storage device is a memory where a program to be executed by the controller 101 and data to be used by the control program are loaded. The auxiliary storage device stores programs to be executed by the controller 101 and data to be used by the control programs.

The storage 102 stores contract data 102A and residual value data 102B.

The contract data 102A is generated by the data transmitter 1012.

FIG. 3 illustrates an example of the contract data 102A. As illustrated in FIG. 3, the contract data 102A includes a user identifier, a vehicle model identifier, a first body color identifier, a second body color identifier, and other information related to the lease contract (for example, contract term and usage fee).

The residual value data 102B is related to the residual value of the vehicle for each body color.
The residual value is a valuation price of the vehicle after an elapse of a predetermined period. The residual value of the vehicle will be described. The valuation price when selling a vehicle as a used car may vary depending on a vehicle model and age. Even for the same vehicle model and age, the valuation price may vary depending on the body color.
Therefore, when concluding a lease contract, the contract management server 100 determines the body color (first body color) of the leased vehicle based on an expected residual value for each body color at the end of the contract. When a body color with a higher expected residual value is selected, the valuation price of the vehicle after the end of the lease contract will increase. Therefore, the monthly usage fee can be reduced.

FIG. 4 illustrates an example of the residual value data 102B. The residual value data 102B describes, for each first body color, the residual value of a vehicle after an elapse of a predetermined contract term. As illustrated in FIG. 4, the residual value data includes a vehicle model identifier, a first body color identifier, an application period, a contract term, and a set residual value. The set residual value is a residual value guaranteed in advance by a business entity. The set residual value is a residual value of the vehicle after the predetermined contract term expires and the peelable paint is peeled off. The set residual value may be set based on an expected valuation price in the used car market (expected residual value).

The application period is an effective period of the residual value data. Since the market prices of used cars fluctuate on a daily basis, the information can be kept fresh by setting the application period.

In the illustrated example, when a vehicle with a vehicle model "V001" and a first body color "P001" is contracted in April 2021, the residual value will be 1.5 million yen after an elapse of three years.

The residual value data 102B is updated as appropriate depending on the market prices in the used car market.

The pieces of data described above may be constructed such that a program of a database management system (DBMS) executed by the processor manages the data stored in the storage device. In this case, each piece of data may be, for example, a relational database.

The communicator 103 is a communication interface for connecting the contract management server 100 to the network. The communicator 103 includes, for example, a network interface board and a wireless communication interface for wireless communication.

Next, the dealer server 200 will be described.
The dealer server 200 is a device that manages a plurality of vehicles to be rented to users and places orders for the vehicles with bases (vehicle bases) to which the vehicles belong when lease contracts are concluded. When the first body color and the second body color are designated, an instruction is given so that the vehicle having the designated body color is overpainted in the designated color. For example, when white is designated as the first body color and red is designated as the second body color, a vehicle having the white body color is determined as the leased vehicle, and an instruction to "overpaint the vehicle in red and ship the vehicle" is issued to a vehicle base to which the vehicle belongs.

The dealer server 200 may be a general-purpose computer similarly to the contract management server 100. That is, the dealer server 200 may be a computer including a processor such as a CPU or a GPU, a main storage device such as a RAM or a ROM, and an auxiliary storage device such as an EPROM, a hard disk drive, or a removable medium.

The dealer server 200 includes a controller 201, a storage 202, and a communicator 203.

The controller 201 is an arithmetic unit responsible for control that is performed by the dealer server 200. The controller 201 can be implemented by an arithmetic processing unit such as a CPU.

The controller 201 includes two functional modules that are a manager 2011 and an instructor 2012. Each functional module may be implemented by the CPU executing the stored programs.

The manager 2011 manages the ordering of a plurality of vehicles to be rented to the users as leased vehicles. Specifically, data related to vehicle ordering (for example, supplier vehicle base, stock status, and delivery date) is managed for the specifications of each leased vehicle (for example, vehicle model and body color). The data related to the vehicle ordering is stored in vehicle data 202A described later.

When a vehicle lease contract is concluded, the instructor 2012 generates data to order a vehicle (ordering data) and transmits the data to an appropriate vehicle base. When the vehicle is a stock vehicle, the ordering data may be transmitted to a carpool to which the vehicle belongs. When the vehicle is produced by order basis, the ordering data may be transmitted to a vehicle manufacturing factory. When the first body color and the second body color are different, the instructor 2012 instructs the vehicle base to paint the vehicle with the peelable paint.

The storage 202 includes a main storage device and an auxiliary storage device. The main storage device is a memory where a program to be executed by the controller 201 and data to be used by the control program are loaded. The auxiliary storage device stores programs to be executed by the controller 201 and data to be used by the control programs.

The storage 202 stores the vehicle data 202A.

FIG. 5 illustrates an example of the vehicle data 202A. As illustrated in FIG. 5, the vehicle data 202A includes a vehicle model identifier, a first body color identifier, a status, delivery dates, and a supplier vehicle base identifier. In FIG. 5, a delivery date A is a delivery date when the vehicle is delivered in the original first body color, and a delivery date B is a delivery date when the vehicle is overpainted with the peelable paint. The vehicle data 202A is updated as appropriate depending on a production status of the vehicle.

The communicator 203 is a communication interface for connecting the dealer server 200 to the network. The communicator 203 includes, for example, a network interface board and a wireless communication interface for wireless communication.

The configurations illustrated in FIG. 2 are examples, and all or part of the functions illustrated in FIG. 2 may be performed by using circuits designed exclusively for those functions. The programs may be stored in or executed by a combination of a main storage device and an auxiliary storage device other than the combinations illustrated in FIG. 2.

Figure 6A:
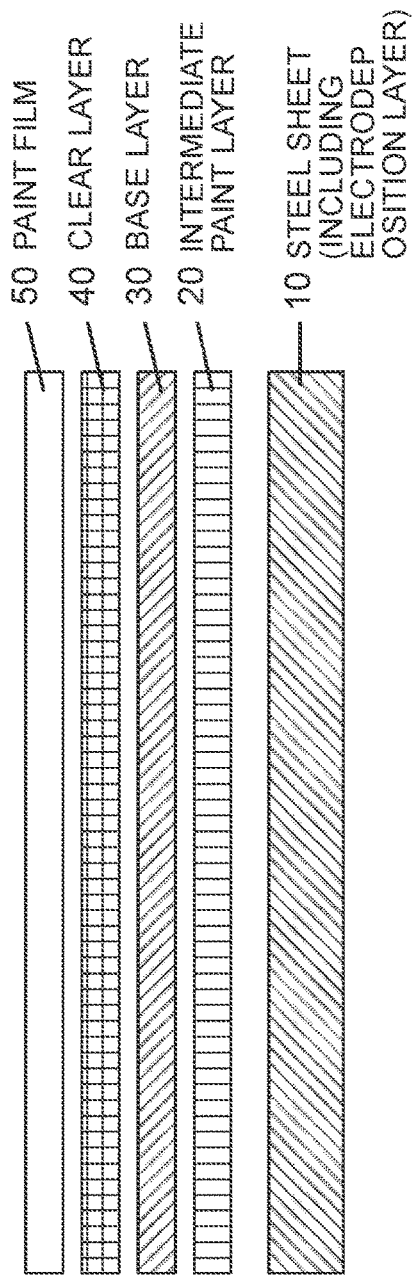
FIG. 6A is a schematic diagram of painting with a peelable paint.

The peelable paint will briefly be described. FIG. 6A is a schematic sectional view illustrating a body member (for example, a steel sheet) of a vehicle body and a paint film formed on the body member. As illustrated in FIG. 6A, the body member includes a steel sheet 10 formed by metalworking and having an electrodeposition layer, and an intermediate paint layer 20, a base layer 30, and a clear layer 40 sequentially formed on the electrodeposition layer.

A paint film 50 is formed on the outer surface of the body member. The paint film 50 is a paint layer formed by applying the peelable paint, and has a property that the paint film 50 can easily be peeled off by applying a force as compared with a general paint film. The paint film 50 is formed by, for example, applying the peelable paint to the body member by a spraying method. Examples of the peelable paint include paints composed of xylene, ethylbenzene, an antioxidant, methylethylketone, a silica reactant, a titanium oxide (nanoparticles), and an organic solvent.

The overpaint of the vehicle with the peelable paint can be performed at a predetermined vehicle base before the vehicle is shipped. Thus, the body color of the vehicle can easily be changed (that is, the first body color can be changed to the second body color). The same applies to the peeling of the paint film 50. By peeling off the paint film 50 at the predetermined vehicle base, the body color of the vehicle can be returned to the original color (that is, the second body color can be returned to the first body color). Since the original paint is protected by the paint film 50, it is possible to obtain a used car in which the body paint is not deteriorated.

In this example, the steel sheet is exemplified as the body member, but the body member may be a resin member. In this case, the intermediate paint layer 20 is a primer layer. A clear layer may further be provided on the paint film 50.

Figure 6B:
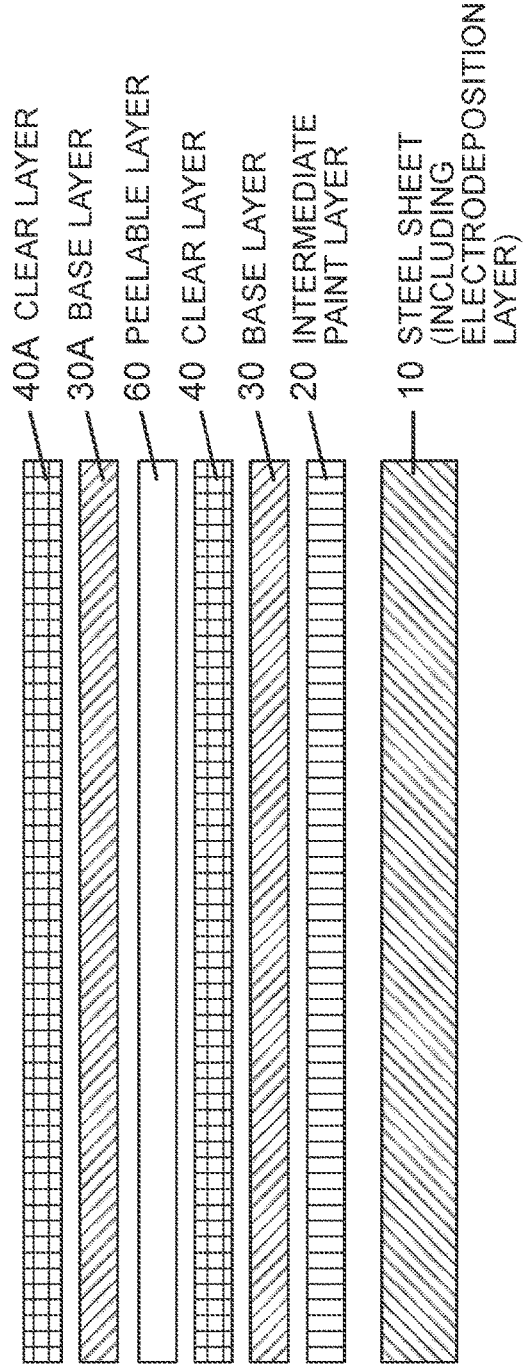
FIG. 6B is a schematic diagram of painting with a peelable paint.

In the example of FIG. 6A, the paint itself has the peelable property, but a general paint may be applied onto a layer having the peelable property. For example, as illustrated in FIG. 6B, an uncolored peelable layer 60 may be formed from the same material as that of the paint film 50, and a base layer 30A and a clear layer 40A may be formed on the peelable layer 60. The base layer 30A is a paint layer having a color different from that of the base layer 30. Even in such a form, the paint layer can be removed by peeling off the peelable layer 60. The peelable layer and the paint applied on the peelable layer are herein referred to collectively as "peelable paint".

In this example, the single color is exemplified as each of the first body color and the second body color, but each of the first body color and the second body color may be composed of a plurality of colors. For example, each of the first body color and the second body color may be composed of a plurality of colors arranged in a predetermined pattern. The "color" or "body color" may herein be expressed not only by a single-layer paint film but also by a plurality of paint or material layers. The layers may include, for example, a clear layer, a glass flake layer, a mica layer, and a pearl layer.

The overpaint in the second body color may be performed on at least a part of the paint in the first body color. That is, the overpaint in the second body color need not cover the entire paint in the first body color. For example, when the first body color is black, a vehicle having a two-tone color combination of black and blue can be obtained by applying a blue overpaint to a part of the first body color.

The description returns to that on the server devices included in the vehicle rental system.

FIG. 7 is a flowchart illustrating a process to be executed by the contract management server 100. The process illustrated in FIG. 7 is started, for example, at a timing when a user logs in to the contract management server 100. It is assumed that the contract management server 100 has completed identification of the user at the start timing of the process.

Processes of Steps S11 to S16 are executed by the condition determiner 1011.

In Step S11, a model and a contract term of a leased vehicle are determined. In this step, the user is prompted to select a model of a vehicle to be rented from among a plurality of preset vehicle models. The user is prompted to select a contract term desired by the user from among preset contract terms. These selections may be made by the user, for example, via a screen illustrated in FIG. 8. In the example of FIG. 8, reference numeral 801 represents a graphical user interface (GUI) component for selecting the vehicle model. Reference numeral 803 represents a GUI component for selecting the contract term.

In Steps S12 and S13, the body color (first body color) of the leased vehicle is determined. In Step S12, residual values in individual body colors after the end of the contract term are first acquired by referring to the residual value data 102B.

In Step S13, the body color (first body color) of the leased vehicle is determined based on the residual values in the individual body colors after the end of the contract term. The first body color can be determined by the device based on a predetermined criterion. For example, the following criteria can be used.

(1) Among a plurality of body colors, a body color with the highest residual value is determined as the first body color.
(2) A body color with a residual value higher than a predetermined value is determined as the first body color.

The predetermined value may be a value based on a price of a new vehicle in the corresponding model. For example, a color with a residual value higher than 65% of the price of the new vehicle after an elapse of three years can be determined as the first body color.

In general, a body color with a high residual value is determined by its popularity in the used car market. For example, a body color including a pearl layer tends to be more popular than the other body colors and have a higher residual value. Therefore, the color that can be selected as the first body color is more limited than the color that can be selected as the second body color.

In Step S14, a selection of the second body color is acquired. In this step, a plurality of preset second body colors is presented to the user, and the user is prompted to select a desired color. In the example of FIG. 8, reference numeral 802 represents a GUI component for selecting the second body color.

In Step S15, other contract conditions are determined. One of the other contract conditions is, for example, a monthly usage fee.

For example, when returning the leased vehicle after the three-year contract expires, the monthly usage fee is determined based on an amount obtained by subtracting the residual value after the elapse of three years from the vehicle price. Therefore, the monthly usage fee can be determined based on the first body color determined in Step S13.

In Step S16, a delivery date of the vehicle is inquired. Specifically, an inquiry is made on the dealer server 200 about the delivery date of the vehicle when the vehicle having the first body color determined in Step S13 is overpainted in the second body color determined in Step S14. The dealer server 200 determines the delivery date of the requested vehicle based on the vehicle data 202A and responds to the inquiry.

In Step S17, the data transmitter 1012 generates contract data based on the determined contract conditions and transmits the contract data to the dealer server 200.

FIG. 9 is a flowchart illustrating a process to be executed by the dealer server 200. The process illustrated in FIG. 9 is started, for example, at a timing when the contract management server 100 transmits ordering data.

In Step S21, the manager 2011 first determines a supplier vehicle base for the vehicle. In this step, for example, the stock of a vehicle having the specifications indicated by the contract data is checked by referring to the vehicle data 202A, and determination is made as to whether to deliver the stock vehicle or to newly produce a vehicle.

In Step S22, the instructor 2012 determines whether overpaint is necessary. Examples of the case where the overpaint is necessary include a case where the first body color and the second body color are different.

When the overpaint is necessary, the process proceeds to Step S23, and the instructor 2012 generates ordering data including a painting instruction. The ordering data includes the vehicle specifications, the first body color, the second body color, and the like. The vehicle base that has received the ordering data prepares (or manufactures) a vehicle that meets the specifications and paints the vehicle in the second body color.

When the overpaint is not necessary, the process proceeds to Step S24, and the instructor 2012 generates ordering data that does not include the painting instruction.

The generated ordering data is transmitted to the vehicle base. At a timing when the transmission of the ordering data is completed, the dealer server 200 may notify the contract management server 100 that the order for the vehicle has been completed. The notification may include information about the delivery date. The vehicle base prepares the leased vehicle based on the ordering data and delivers the leased vehicle to the user.

Next, a process after the vehicle lease contract has ended (expired) will be described.

FIG. 10 is a flowchart illustrating a process to be executed by the dealer server 200 at the end of the contract. The illustrated process is started, for example, when notification data about the end of the contract is received from the contract management server 100.

In Step S31, the manager 2011 first determines a vehicle base where the returned leased vehicle is stored.

In Step S32, the instructor 2012 determines whether the paint needs to be peeled off from the leased vehicle. For example, when the vehicle is overpainted at the time of delivery, determination is made that the paint needs to be peeled off.

When the paint needs to be peeled off, the process proceeds to Step S33, and the instructor 2012 generates storing data including a paint peeling instruction. The storing data is notification data about the storage of the leased vehicle whose contract has ended, and includes a contract identifier, a leased vehicle identifier, a scheduled storing date, and the like. The vehicle base that has received the storing data accepts the vehicle. When the storing data includes the paint peeling instruction, the vehicle base peels off the overpaint on the vehicle.

When the paint does not need to be peeled off, the process proceeds to Step S34, and the instructor 2012 generates storing data that does not include the paint peeling instruction. The generated storing data is transmitted to the vehicle base. When the transmission of the storing data is completed, the dealer server 200 transmits information about the storage to the contract management server 100. The notification may include information about the storing date. The vehicle base accepts the leased vehicle based on the storing data and peels off the overpaint as necessary.

As described above, in the vehicle rental system according to the first embodiment, the contract management server 100 determines a combination of the original body color of the vehicle to be rented to the user and the color of the peelable paint to be applied over the vehicle. At this time, an appropriate color combination can be generated in consideration of the expected residual value of the vehicle from which the peelable paint is peeled off after the end of the contract term. As a result, it is possible to determine the specifications of the vehicle with a higher residual value, thereby reducing the payment amount of the fee during the lease contract.

Modification of First Embodiment

In the first embodiment, the residual value of the vehicle after the contract term expires is obtained from the residual value data, and the lease fee (monthly usage fee) of the vehicle is determined based on the residual value. The process of obtaining the residual value of the vehicle is not essential. For example, the lease fee (monthly usage fee) of the vehicle may directly be determined based on the first body color or the combination of the first body color and the second body color. Therefore, the contract management server 100 may store data in which the body color and the lease fee are associated with each other.

Second Embodiment

In the first embodiment, the contract management server 100 determines the original body color (first body color) of the leased vehicle. When the user is expected to purchase the vehicle after the end of the contract, the user may select the first body color.

In the present embodiment, in Steps S13 and S14, the condition determiner 1011 presents a screen illustrated in FIG. 11 to the user, and prompts the user to select the first body color and the second body color. In the example of FIG. 11, reference numeral 1101 represents a GUI component for selecting the first body color, and reference numeral 1102 represents a GUI component for selecting the second body color.

In the present embodiment, the condition determiner 1011 can present residual values in the individual body colors to the user. FIG. 12 illustrates an example of an information screen about the residual values of the vehicle in the individual first body colors after the end of the contract. The user may be prompted to select the first body color with such a screen presented to the user. According to such a case, the user can consider the choice of the first body color in consideration of the residual values of the vehicle after the end of the contract.

When there is a possibility that the vehicle will be returned to the leasing company after the end of the contract, it is preferable that the first body color be selected from a body color group with a residual value higher than the predetermined value.

Third Embodiment

In the first and second embodiments, it is premised that the vehicle is painted with the peelable paint. The user may choose whether to paint the vehicle with the peelable paint. In a third embodiment, the user is prompted to choose whether to paint the vehicle with the peelable paint, and the residual value of the vehicle is calculated based on the choice.

Figure 14:
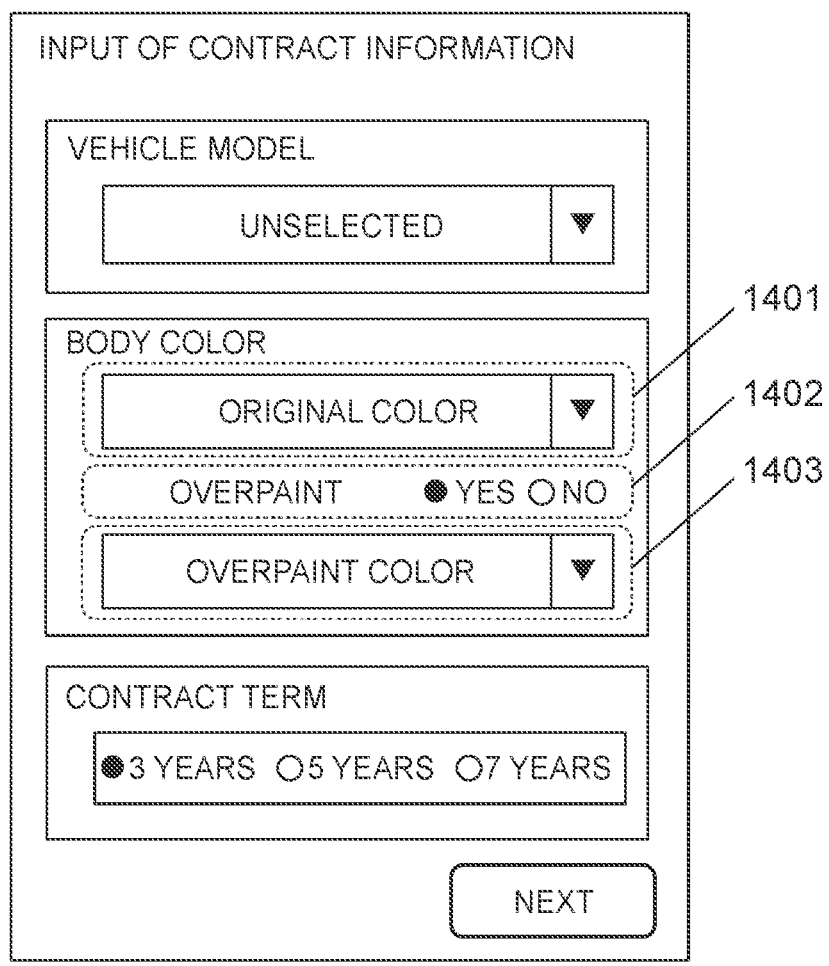
FIG. 14 illustrates an example of a screen presented to the user in the third embodiment.

FIG. 13 is a flowchart of a process to be executed by the contract management server 100 in the third embodiment. The illustrated process is performed in place of Steps S13 and S14 illustrated in FIG. 7. FIG. 14 illustrates an example of a screen provided to the user in the flow.

In Step S41, a selection of the first body color is first acquired. In the example of FIG. 14, reference numeral 1401 represents a GUI component for selecting the first body color.

In Step S42, determination is made as to whether the overpaint is desired. In the example of FIG. 14, reference numeral 1402 is a GUI component for choosing whether to desire the overpaint.

When the user desires the overpaint in Step S42, the process proceeds to Step S43 to acquire a selection of the second body color. In the example of FIG. 14, reference numeral 1403 represents a GUI component for selecting the second body color.

In Step S44, the residual value of the vehicle after the paint is peeled off is presented. This process is the same as that in the second embodiment.

When the user does not desire the overpaint in Step S42, the process proceeds to Step S45 to present the residual value of the vehicle after the end of the contract based on the first body color.

The step of presenting the residual value and the step of receiving the selection of the body color may be reversed or repeated.

Both the residual value presented in Step S44 and the residual value presented in Step S45 are based on the first body color. When the overpaint is applied, the paint in the first body color is protected by the overpaint, thereby suppressing deterioration of the paint. Therefore, the contract management server 100 makes a correction to increase the residual value of the vehicle when the overpaint is applied as compared with a case where the overpaint is not applied. The correction can be performed by using a predetermined mathematical expression, table, or the like.

As described above, in the third embodiment, the residual value of the vehicle can be calculated in consideration of the paint protection effect caused by overpaint with the peelable paint.

Fourth Embodiment

In the first to third embodiments, the residual value of the vehicle after an elapse of the predetermined period is determined based on the first body color. These embodiments are premised on a condition that the peelable paint is peeled off and the vehicle is resold after the elapse of the predetermined period.

When the number of years since the manufacture of the vehicle is shorter than the useful life of the peelable paint, the "vehicle itself painted with the peelable paint" may have some value. Such a vehicle has a high resale value and is also valuable to a user who prefers a specific body color.

In a fourth embodiment, the residual value of the vehicle is determined based on a combination of the first body color and the second body color.

In the fourth embodiment, the contract management server 100 acquires and presents to the user both (1) a residual value of the vehicle when the peelable paint is peeled off after the elapse of the predetermined period, and (2) a residual value of the vehicle when the peelable paint is not peeled off.

FIG. 15 illustrates an example of residual value data in the fourth embodiment. In the present embodiment, as illustrated in FIG. 15, the residual value of the vehicle is defined by a combination of the first body color and the second body color. When acquiring selections of the first body color and the second body color, the residual value for each body color combination is presented to the user by referring to the residual value data. For example, a residual value when the peelable paint is peeled off (the body color is returned to the first body color) as illustrated in FIG. 12 and a residual value when the peelable paint is not peeled off (the second body color is maintained) as illustrated in FIG. 16 are output. Thus, it possible to present the expected valuation price of the vehicle to the user more accurately.

Modifications

The embodiments described above are only illustrative, and the present disclosure may be modified as appropriate without departing from the gist of the present disclosure.

For example, the processes and means described in the present disclosure may be combined as desired as long as no technical contradiction occurs.

The description of the embodiments is directed to the example in which the leased vehicle is rented to the user. The information processing device according to the present disclosure may also be applied to cases other than the lease. The information processing device according to the present disclosure may also be applied to a sales method such as a residual value setting loan (that is, a sales method in which the user's payment amount is determined based on an amount obtained by subtracting a residual value after an elapse of a predetermined period from a vehicle price).

When selling a new vehicle, the use of the peelable paint may be proposed to a user. When the user agrees, the first body color and the second body color may be determined and a vehicle that meets the specifications may be delivered. In this case, the peelable paint may be peeled off based on the user's desire after an elapse of a predetermined period. In this case, the contract management server 100 functions as a device for determining the specifications of the vehicle to be sold to the user.

In the description of the embodiments, the first body color and the second body color are different colors, but may be the same color. By using the peelable paint, the effect of protecting the original paint color can be obtained.

In the description of the embodiments, the residual value of the vehicle is acquired based on the first body color or the combination of the first body color and the second body color, but may be acquired only based on the second body color.

The process described as being executed by a single device may be executed by a plurality of devices in cooperation. Alternatively, the process described as being executed by different devices may be executed by a single device. In the computer system, the hardware configuration (server configuration) that implements functions may be changed flexibly.

The present disclosure may be embodied such that a computer program that implements the functions described in the embodiments described above is supplied to a computer and is read and executed by one or more processors of the computer. The computer program may be provided to the computer by being stored in a non-transitory computer-readable storage medium connectable to a system bus of the computer, or may be provided to the computer via a network. Examples of the non-transitory computer readable storage medium include any types of disk or disc such as magnetic disks (for example, a floppy (registered trademark) disk and a hard disk drive (HDD)) and optical discs (for example, a compact disc ROM (CD-ROM), a digital versatile disc (DVD), and a Blu-ray disc), and any types of medium suitable to store electronic instructions, such as a read only memory (ROM), a random access memory (RAM), an EPROM, an electrically erasable programmable ROM (EEPROM), a magnetic card, a flash memory, and an optical card.

What is claimed is:

1. An information processing system comprising:
a contract management server that comprises:
at least one memory storing instructions and storing residual value data including a residual value of a first vehicle for each of a plurality of first paint colors after an elapse of a predetermined time period,
a server communication interface, and
at least one processor operatively connected to the at least one memory; and
a user terminal that comprises:
a display screen that displays a graphical user interface (GUI), and
a user terminal communication interface for connecting the user terminal to the server communication interface via a network;
wherein the at least one processor of the contract management server is configured to:
cause the GUI to display the plurality of first paint colors and the residual value of each of the plurality of first paint colors in order to prompt the user to make a selection;
acquire a first paint color, from among the plurality of first paint colors, that is a vehicle color of the first vehicle based on a user input via the GUI, wherein the user input selects the first paint color in consideration of the residual value;
cause the GUI to display a plurality of second paint colors after the first paint color is selected, so as to prompt the user to select a second paint color from among the plurality of second paint colors;
acquire the second paint color that is aan overcoat color including a peelable layer to be overcoated on at least a part of the vehicle painted in the first paint color, based on the user input via the GUI;
acquire a current or future valuation price of the first vehicle based on the first paint color or the second paint color.

2. The information processing system according to claim 1, wherein the at least one processor is configured to acquire an expected valuation price of the first vehicle after the elapse of the predetermined period based on the first paint color or the second paint color.

3. The information processing system according to claim 1, wherein the at least one processor is configured to acquire an expected valuation price of the first vehicle after the elapse of the predetermined period based on the first paint color and the second paint color.

4. The information processing system according to claim 2, wherein the at least one processor is configured to acquire, based on the first paint color, an expected valuation price of the first vehicle in a case where the peelable layer is peeled off after the elapse of the predetermined period.

5. The information processing system according to claim 2, wherein the at least one processor is configured to acquire both a first expected valuation price of the first vehicle in a case where the peelable layer is peeled off after the elapse of the predetermined period, and a second expected valuation price of the first vehicle in a case where the peelable layer is not peeled off.

6. The information processing system according to claim 2, wherein the at least one processor is configured to determine, based on the expected valuation price, an amount to be paid as a value of the first vehicle by the user who uses the first vehicle for at least the predetermined period.

7. The information processing system according to claim 6, wherein the amount is determined based on an amount obtained by subtracting the expected valuation price from a price of the first vehicle.

8. The information processing system according to claim 1, wherein:
the information processing device is configured to determine specifications of the first vehicle to be used by the user; and
the at least one processor is configured to acquire, for the plurality of first paint colors, expected valuation prices of the first vehicle in a case where the peelable layer is peeled off after the elapse of the predetermined period.

9. The information processing device according to claim 8, wherein:
the first vehicle is a vehicle to be rented to the user during the predetermined period; and
the at least one processor is configured to determine a rental condition of the first vehicle based on the expected valuation price.

10. The information processing device according to claim 1, wherein:
the plurality of first paint colors are selected from a first category; and
the plurality of the second paint colors are selected from a second category including more color variations than color variations of the first category.

11. The information processing device according to claim 10, wherein the first paint color is a body color including a pearl layer.

12. An information processing device comprising:
at least one memory storing instructions and storingresidual value data including a residual value of a first vehicle for each of a plurality of first paint colors after an elapse of a predetermined time period; and
at least one processor operatively connected to the at least one memory, the at least one processor configured to:
set an application period for updating the residual value data of the first vehicle, wherein the application period is an effective period of the residual value data;
update the residual value data stored in the memory every time the application period elapses;
acquire a first designation of a first paint color that is a vehicle color of a first vehicle, wherein the first paint color is selected from among the plurality of first paint colors, based on the residual value of the first paint color being higher than a predetermined value;
control a display screen of a user terminal to display a graphical user interface (GUI) prompting a user to select a second paint color from among a plurality of second paint colors,
acquire a second designation of the second paint color, wherein the second paint color is an overcoat color including a peelable layer to be overcoated on at least a part of the vehicle painted in the first paint color;
determine, based on the first paint color or the second paint color, an amount to be paid as a value of the first vehicle by the user who uses the first vehicle for at least the predetermined period.

13. The information processing device according to claim 12, wherein the at least one processor is configured to:
acquire an expected valuation price of the first vehicle after an elapse of the predetermined period based on the first paint color or the second paint color; and
determine the amount based on the expected valuation price.

14. The information processing device according to claim 13, wherein the at least one processor is configured to:
acquire, based on the first paint color, an expected valuation price of the first vehicle in a case where the peelable layer is peeled off after the elapse of the predetermined period; and
determine the amount based on the expected valuation price.

15. The information processing device according to claim 13, wherein the amount is determined based on an amount obtained by subtracting the expected valuation price from a price of the first vehicle.

16. An information processing device comprising:
at least one memory storing instructions; and
at least one processor operatively connected to the at least one memory, the at least one processor configured to:
control a graphical user interface (GUI) of a user terminal to prompt a user to select at least one of: a first paint color from among a plurality of first paint colors, and a second paint color from among a plurality of second paint colors, wherein the GUI includes residual values of each of the plurality of first paint colors so that the user selects the first paint color based on the residual values;
receive a designation from the user terminal indicating a first vehicle that includes the first paint color to be overpainted on at least a part of the first vehicle with the second paint color including a peelable layer; and
acquire an expected valuation price of the first vehicle after an elapse of a predetermined period based on whether the first vehicle includes the first paint color and the second paint color painted on the first paint color, wherein the expected valuation price is higher in a case that the first vehicle includes the first paint color and the second paint color as compared to a case that the first vehicle includes the first paint color without the second paint color.

17. The information processing device according to claim 16, wherein the at least one processor is configured to, when the first vehicle includes the second paint color, acquire an expected valuation price of the first vehicle in a case where the second paint is peeled off after the elapse of the predetermined period.

* * * * *